(12) United States Patent
Foster

(10) Patent No.: US 11,446,530 B2
(45) Date of Patent: Sep. 20, 2022

(54) INERT GAS FIRE PROTECTION SYSTEM

(71) Applicant: The Boeing Company, Chicago, IL (US)

(72) Inventor: Frank J. Foster, Summerville, SC (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 16/444,937

(22) Filed: Jun. 18, 2019

(65) Prior Publication Data

US 2020/0398093 A1 Dec. 24, 2020

(51) Int. Cl.
| | | |
|---|---|---|
| *A62C 99/00* | (2010.01) | |
| *B64D 37/32* | (2006.01) | |
| *A62C 35/02* | (2006.01) | |
| *B01J 19/14* | (2006.01) | |
| *A62C 3/08* | (2006.01) | |
| *B64D 45/00* | (2006.01) | |

(52) U.S. Cl.
CPC ............ *A62C 99/0018* (2013.01); *A62C 3/08* (2013.01); *A62C 35/023* (2013.01); *B01J 19/14* (2013.01); *B64D 37/32* (2013.01); *B64D 2045/009* (2013.01)

(58) Field of Classification Search
CPC ..... A62C 99/0018; A62C 3/08; A62C 35/023; B01J 19/14; B64D 37/32; B64D 2045/009
USPC .......................................................... 169/62
See application file for complete search history.

(56) References Cited

U.S. PATENT DOCUMENTS

2003/0051887 A1\* 3/2003 Cramer .............. A62C 99/0018
169/62

OTHER PUBLICATIONS

Roberts, et al.; "Impact of Halon Replacement on Aircraft Engine Bay Fire Protection System Design"; Halon Options Technical Workins Conference; Northrop Grumnian Corporation; Apr. 1999.

\* cited by examiner

*Primary Examiner* — Christopher S Kim
(74) *Attorney, Agent, or Firm* — Parsons Behle & Latimer

(57) ABSTRACT methods, apparatuses, and systems for harvesting inert gas exhausted from an engine and using the harvested inert gas to prevent an ignition event and/or extinguish an ignition event. The temperature of the harvested inert gas may need to be lowered. Unwanted components may be removed from the harvested inert gas. Combustion components may be completely burned from the harvested inert gas prior to providing the harvested inert gas to a fire protection system. The fire protection system uses the harvested inert gas to extinguish an ignition event and/or to provide a purge flow to prevent an ignition event. The fire protection system may be on an aircraft. Sensors may be used to detect an ignition event. Pressure sensors may be used to monitor the pressure of the harvested inert gas as well as to monitor the purge pressure of areas receiving a continuous purge flow of harvested inert gas.

20 Claims, 5 Drawing Sheets

INERT GAS FIRE PROTECTION SYSTEM

FIELD OF THE DISCLOSURE

The examples described herein relate to apparatus, systems, and methods of harvesting inert gas exhausted from an engine to extinguish an ignition event.

BACKGROUND

Description of the Related Art

Fire protection systems are currently used to extinguish fires including ignition events that may develop into a fire. For example, aircraft may include a fire protection system that flows Halon 1301 to a specific area of an aircraft upon the detection of an ignition event within the area. Halon 1301 is very effective in extinguishing ignition events. However, Halon 1301 is considered a Class I ozone-depleting substance. Thus, it would be beneficial for a fire protection system to be able to extinguish an ignition event without the need of using Halon 1301. Halon 1301 is typically stored in tanks aboard an aircraft, which increases the overall weight of the aircraft. The storage tanks provide a limited supply of Halon 1301 to be used by the fire protection system. Additionally, Halon 1031 is expensive increasing the cost of aircraft flights. Other disadvantages may exist.

SUMMARY

The present disclosure is directed to apparatus, systems, and methods of harvesting inert gas exhausted from an engine to extinguish an ignition event.

One example of the present disclosure is a method comprising harvesting inert gas exhausted from an engine. The method includes lowering a temperature of the harvested inert gas. The method includes providing the harvested inert gas to a fire protection system, wherein the fire protection system provides the harvested inert gas to extinguish an ignition event.

The fire protection system may be on an aircraft. The method may include providing a first purge flow to a first area of the aircraft. The method may include monitoring a first purge pressure within the first area of the aircraft, wherein the fire protection system stops the first purge flow to the first area of the aircraft if the first purge pressure exceeds a predetermined threshold pressure. The method may include providing a second purge flow to a second area of the aircraft. The method may include monitoring a second purge pressure within the second area of the aircraft, wherein the fire protection system stops the second purge flow to the second area of the aircraft if the second purge pressure exceeds the predetermined threshold pressure.

The method may include completely burning residual components of combination in the harvested gas prior to lowering the temperature of the harvested gas. The method may include removing undesirable components from the harvested inert gas prior to providing the harvested gas to the fire protection system. The method may include pressuring the harvested inert gas to a predetermined pressure. The method may include storing a portion of the harvested inert gas within a tank. The method may include providing the harvested inert gas from the tank to extinguish the ignition event.

One example of the present disclosure is an aircraft fire protection system. The aircraft fire protection system includes a valve configured to harvest inert gas exhausted from an engine. The aircraft fire protection system includes a conduit for receiving a flow of inert gas from the valve and a heat exchanger in communication with the conduit and the flow of inert gas, wherein the heat exchanger reduces a temperature of the flow of inert gas. The aircraft fire protection system includes a plurality of flow paths to direct the flow of inert gas to a plurality of locations within an aircraft.

The aircraft fire protection system may include a gas cleaner in communication with the flow of inert gas, wherein the gas cleaner removes unwanted components from the flow of inert gas. The inert gas may continuously flow to the plurality of locations within the aircraft during operation of the engine. The aircraft fire protection system may include a plurality of pressure sensors and a plurality of distribution valves, wherein the plurality of distribution valves are configured to prevent the continuous flow of inert gas to a first location when one of the plurality of pressure sensors detects a pressure above a predetermined threshold purge pressure at the first location. The aircraft fire protection system may include a plurality of temperature sensors configured to monitor a temperature of a plurality of areas of the aircraft. The aircraft fire protection system may include a plurality of distribution valves, wherein the plurality of distribution valves are configured to deliver the flow of inert gas to a second location upon detection of a temperature above a predetermined temperature at the second location by the one of the plurality of sensors.

One embodiment of the present disclose is an apparatus comprising a valve configured to harvest inert gas exhausted from an engine and a heat exchanger in fluid communication with the valve. The heat exchanger is configured to lower a temperature of harvested inert gas below a predetermined threshold temperature. The apparatus includes a gas cleaning device in fluid communication with the heat exchanger, the gas cleaning device configured to remove unwanted components from harvested inert gas.

The apparatus may include at least one pressure sensor configured to monitor a pressure of harvested inert gas and at least one temperature sensor configured to monitor a temperature of harvested inert gas. The apparatus may include at least one pump and at least one tank, wherein the at least one tank is in fluid communication with the gas cleaning device and is configured to store harvested inert gas and wherein the at least one pump is configured to pressurize harvested inert gas stored within the at least one tank.

Figure 1:
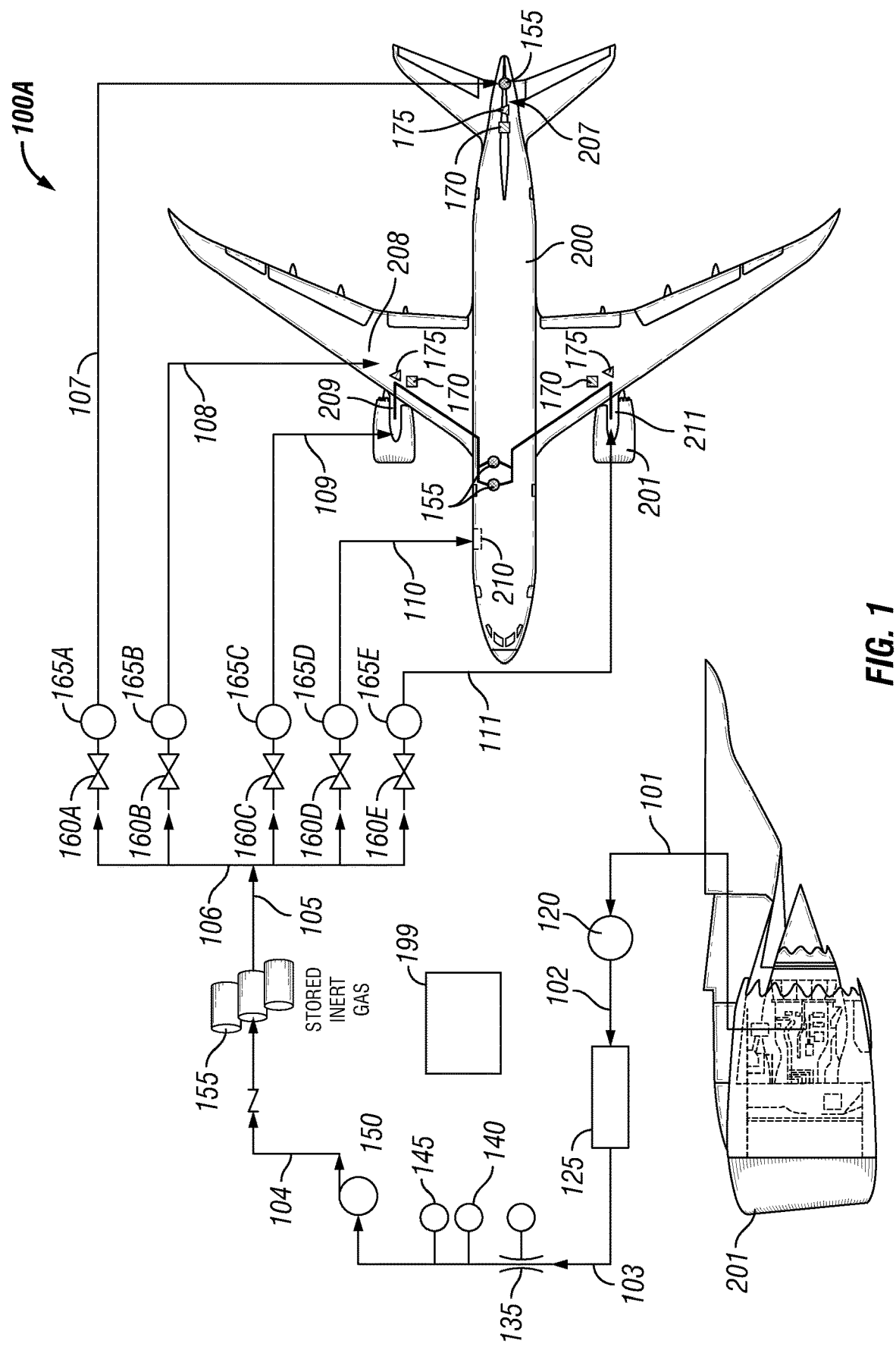
FIG. 1 is a schematic of an embodiment of a fire protection system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 is a schematic of a fire protection system 100A for an aircraft 200. The fire protection system 100A is configured to be activated upon the detection of an ignition event in the aircraft 200. The fire protections system 100A may include one or more controllers 199 that control the operation of the fire protection system 100A. An ignition event includes, but is not limited to, a high energy event, a fire, combustion, an elevated temperature, and rapid oxidation. An ignition event may be detected by various sensors positioned within an aircraft as would be appreciated by one of ordinary skill in the art having the benefit of this disclosure. For example, various temperature sensors 170 may be positioned throughout the aircraft 200 to monitor the temperature of areas of the aircraft 200. The temperature sensors 170 may communicate with the controller 199 wirelessly or via a wire connection. The fire protection system 100A may be activated upon the detection of a temperature above a predetermined threshold temperature by a temperature sensor 170. A first area of the aircraft 200 may have a first predetermined threshold temperature and a second area of the aircraft 200 may have a second predetermined threshold temperature that differs from the first predetermined threshold temperature. The aircraft 200 may also include pressure sensors 175 used to monitor the pressure of various areas within the aircraft 200. The pressure sensors 175 may communicate with the controller 199 wireless or via a wire connection.

The fire protection system 100A is configured to flow inert gas to extinguish an ignition event located in an area of the aircraft 200. The flow of harvested inert gas to extinguish an ignition event may be for a short duration similar to the fire suppression used with Halon 1301 as would be appreciated by one of ordinary skill in the art having the benefit of this disclosure. The inert gas is harvested from one or more engines 201 of the aircraft. The harvested insert gas may include, but is not limited to, carbon dioxide and/or nitrogen. The harvested inert gas flows along a flow path 101, such as a conduit, from the engine to a heat exchanger 120. The heat exchanger 120 lowers the temperature of the harvested inert gas. The harvested inert gas may flow along flow path 102, such as a conduit, from the heat exchanger 120 to a scrubber, or cleaner, 125. The scrubber 125 may be used to remove unwanted components from the harvested inert gas. For example, the unwanted components may include, but are not limited to, nitrogen oxides, carbon monoxide, hydrocarbons, sulfur dioxide, volatile organic compounds, and/or particulate matter.

The harvested inert gas may flow along a flow path 103, such as a conduit, from the scrubber 125 to a pump 150. A flow control valve 135, a temperature sensor 140, and a pressure sensor 145 may be positioned along the flow path 103. The flow control valve 135 may be used to control the flow of the harvested inert gas through the flow path 103. The temperature sensor 140 may be used to monitor the temperature of the harvested inert gas. The flow control valve 135, temperature sensor 140, and pressure sensor 145 may each be connected wirelessly to the controller 199 or alternatively, may be connected via a wire.

If the temperature of the harvested inert gas is above a threshold temperature, the fire protection system 100A may stop the flow until the temperature of the harvested inert gas drops to or below the threshold temperature. The pressure sensor 145 may be used to monitor the pressure of the harvested inert gas. If the pressure of the harvested inert gas is above a threshold pressure, the fire protection system 100A may stop the flow until the pressure of the harvested inert gas drops to or below the threshold pressure. Likewise, the pressure sensor 145 may be used to monitor if the pressure of the harvested inert gas is too low. The location, configuration, and number of the heat exchanger 120, scrubber 125, flow control valve 135, temperature sensor 140, and pressure sensor 145 is shown for illustrative purposes in FIG. 1 and may be varied depending on the application as would be appreciated by one of ordinary skill in the art having the benefit of this disclosure.

A pump 150 may be used to pressurize the flow of harvested inert gas. The operation of the pump 150 may be controlled by the controller 199. The harvested inert gas may flow along flow path 104, such as a conduit, from the pump 150 to one or more storage tanks 155. The storage tanks 155 may be positioned in various areas of the aircraft 200 as shown in FIG. 1. The storage tanks 155 are filled with the harvested inert gas that may be used to extinguish an ignition event within the aircraft 200. The storage tanks 155 are connected to a manifold 106 by a flow path 105, such as a conduit. The manifold 106 includes a plurality of valves 160A-160E that control the flow of harvested inert gas through various flow paths 107-111, which may be conduits, within the aircraft 200. The operation of the plurality of the valves 160A-160E may be controlled by the controller 199. The manifold 106 also includes a plurality of flow control valves 165A-165E that control the rate of flow of the harvested inert gas through the various flow paths 107-111. The plurality of valves 160A-160E and plurality of flow control valves 165A-165E may be integrated into a single plurality of valves. The fire control system 100A may include a plurality of flow paths connected one or more tanks 155 with the plurality of valves 160A-160E in place of the manifold 106 as would be appreciated by one of ordinary skill in the art have the benefit of this disclosure.

The aircraft 200 includes a plurality of flow paths 107-111 that enable harvested inert gas to flow from one or more storage tanks 155 to specific areas of the aircraft 200. For example, flow path 107 enables harvested inert gas to flow to a first area 207 of the aircraft 200, flow path 108 enables harvested inert gas to flow to a second area 208 of the aircraft 200, flow path 109 enables harvested inert gas to flow to a third area 209 of the aircraft 200, flow path 110 enables harvested inert gas to flow to a fourth area 210 of the aircraft 200, and flow path 111 enables harvested inert gas to flow to a fifth area 211 of the aircraft 200. The fire protection system 100A may control the flow of harvested inert gas through the various flow paths 107-111 via one or more controllers 199. For example, the valves 160A-160E may remain closed until there is a detection of an ignition event within the aircraft 200.

Based on the location of the detection, the appropriate valve 160A-160E may be opened to enable the flow of harvested inert gas to extinguish the ignition event. As an example, the temperature sensor 170 may detect an ignition event in area 208 of the aircraft 200, which causes the fire protection system 100A to open valve 160B to enable flow of harvested inert gas along flow path 108 to area 208 of the aircraft 200. The location, configuration, and number of the manifold 106, valves 160A-160B, flow control valves 165A-165E, flow paths 107-111, and areas 207-211 are shown for illustrative purposes in FIG. 1 and may be varied depending on the application as would be appreciated by one of ordinary skill in the art having the benefit of this disclosure. For example, the fire protection system 100A may include more or less than the five flow paths 107-111 shown.

Harvesting the inert gas from the engines 201 of an aircraft 200 eliminates the need to purchase and store halon gas on tanks 155 within the aircraft 200. Additionally, the harvesting of inert gas from the exhaust of engines 201 enables the tanks 155 to be refilled in the event some of the stored gas is used to extinguish an ignition event. The storage of harvested inert gas within one or more tanks 155 enables the use of the fire protection system 100A even in the event that the one or more engines 201 are turned off. In the event the engines 210 are not running, the fire protection system 100A may utilize an auxiliary power unit located in the tail of the aircraft 200. The fire protection system 100A of FIG. 1 is shown above an aircraft 200 for illustrative purposes as the fire protection system 100A may be used in various industrial applications utilizing an engine as would be appreciated by one of ordinary skill in the art having the benefit of this disclosure.

Figure 2:
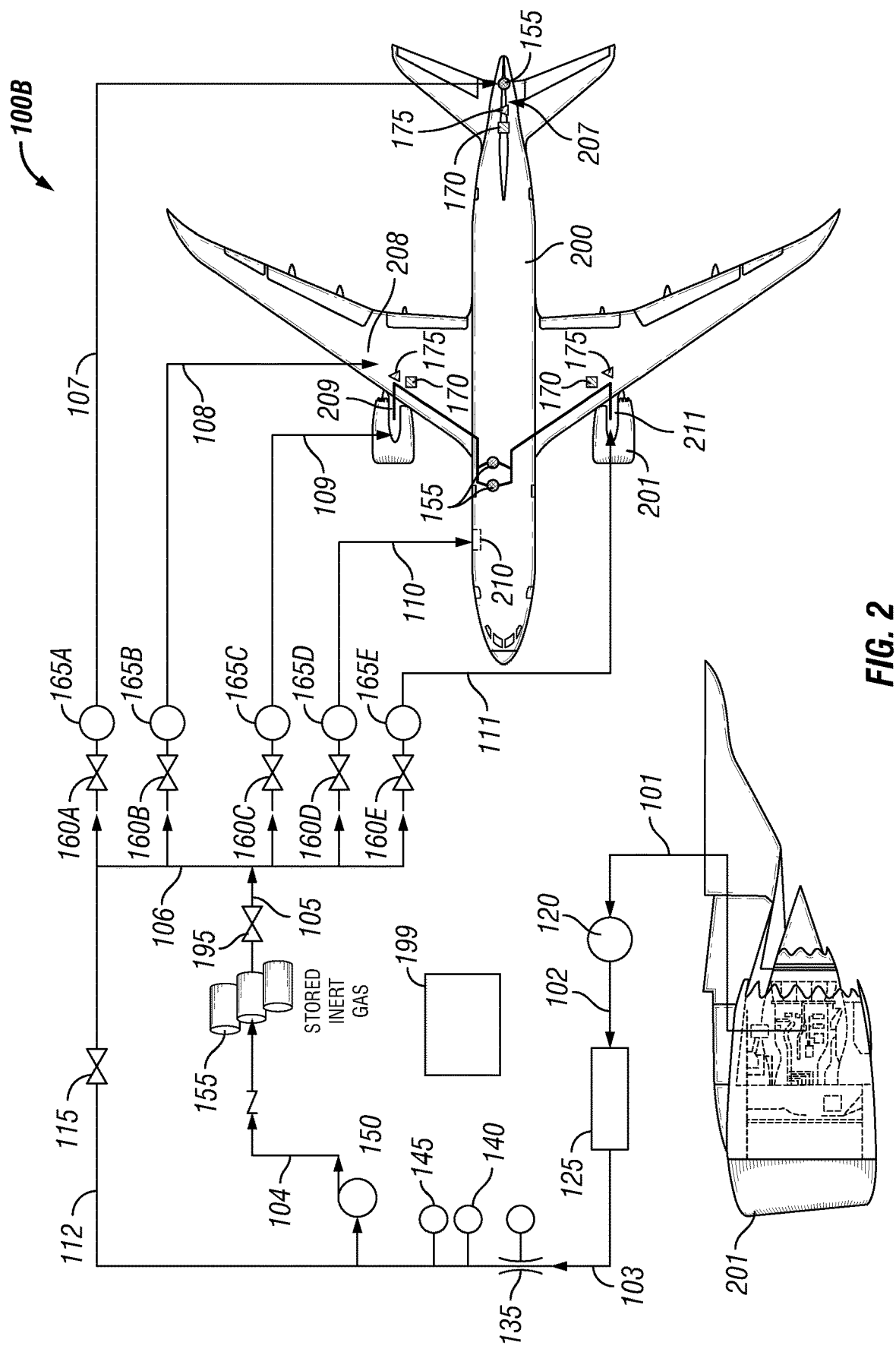
FIG. 2 is a schematic of an embodiment of a fire protection system.

FIG. 2 is a schematic of a fire protection system 100B for an aircraft 200. The fire protection system 100B is configured to be activated upon the detection of an ignition event in the aircraft 200. One or more controllers 199 may control the operation of the fire protection system 100B. As discussed herein, an ignition event includes, but is not limited to, a high energy event, a fire, combustion, an elevated temperature, and rapid oxidation. The ignition event may be detected by various sensors positioned within an aircraft as would be appreciated by one of ordinary skill in the art having the benefit of this disclosure. For example, various temperature sensors 170 may be positioned throughout the aircraft 200 to monitor the temperature of areas of the aircraft 200. The fire protection system 100A may be activated upon the detection of a temperature above a predetermined threshold temperature by a temperature sensor 170. A first area of the aircraft 200 may have a first predetermined threshold temperature and a second area of the aircraft 200 may have a second predetermined threshold temperature that differs from the first predetermined threshold temperature.

As discussed regarding FIG. 1, the fire protection system 100B is configured to flow inert gas harvested from one or more engines 201 to extinguish an ignition event located in an area of the aircraft 200. A heat exchanger 120 lowers the temperature of the harvested inert gas. A scrubber, or cleaning device, 125 may be used to remove unwanted components from the harvested inert gas. A flow control valve 135 may be used to control the flow of the harvested inert gas from the engine 201. A temperature sensor 140 may be used to monitor the temperature of the harvested inert gas. A pressure sensor 145 may be used to monitor the pressure of the harvested inert gas. The location, configuration, and number of the heat exchanger 120, scrubber 125, flow control valve 135, temperature sensor 140, and pressure sensor 145 is shown for illustrative purposes in FIG. 2 and may be varied depending on the application as would be appreciated by one of ordinary skill in the art having the benefit of this disclosure.

A pump 150 may be used to pressurize the flow of harvested inert gas. The harvested inert gas may flow from the pump 150 to one or more storage tanks 155. The storage tanks 155 are filled with the harvested inert gas that may be used to extinguish an ignition event within the aircraft 200. The storage tanks 155 are connected to a plurality of flow paths 107-111. A plurality of valves 160A-160E control the flow of harvested inert gas through various flow paths 107-111 within the aircraft 200. A plurality of flow control valves 165A-165E control the rate of flow of the harvested inert gas through the various flow paths 107-111.

The aircraft 200 includes a plurality of flow paths 107-111 that enable harvested inert gas to flow from one or more storage tanks 155 to specific areas of the aircraft 200 upon detection of an ignition event. For example, flow path 107 enables harvested inert gas to flow to a first area 207 of the aircraft 200, flow path 108 enables harvested inert gas to flow to a second area 208 of the aircraft 200, flow path 109 enables harvested inert gas to flow to a third area 209 of the aircraft 200, flow path 110 enables harvested inert gas to flow to a fourth area 210 of the aircraft 200, and flow path 111 enables harvested inert gas to flow to a fifth area 211 of the aircraft 200. As discussed herein, the fire protection system 100B controls the flow of harvested inert gas through the various flow paths 107-111.

The fire protection system 100B is also configured to enable continuous flow via flow path 112, such as a conduit, to the various flow paths 107-111 of the aircraft 200. Harvested inert gas may be continuously flowed to specific areas of the aircraft 200. In other words, the fire protection system 100B may enable a continuous purge flow of harvested inert gas to specific areas of the aircraft 200. The continual purge flow of harvested inert gas may prevent an ignition event from occurring. A valve 115 along flow path 112 may be used to control the continual flow of harvested inert gas to the aircraft 200. Valve 115 may be used to shut of the continual purge flow of harvested gas. For example, if a valve on the engine 201 broke or malfunctioned creating a high pressure, which was detected by pressure sensor 145, valve 115 may be closed.

A valve 195 may be used to prevent flow of harvested inert gas from the storage tanks until necessary. Thus, the fire protection system 100B may be able both extinguish ignition events upon detection, but also may proactively prevent ignition events from occurring in specific areas of the aircraft 200. The aircraft 200 may include pressure sensors 175 positioned within areas of the aircraft 200 to monitor the purge pressure. The continuous purge flow may be directed to a "closed" volume of the aircraft 200. The closed volume may include an exit port that enables gas to slowly exit the closed volume to ensure that pressure within the closed volume does not exceed a predetermined threshold amount. Pressure sensors 175 may be used to monitor the entry pressure and/or exit pressure of a closed volume to insure the health of the continuous purge flow of harvested inert gas. For example, if a pressure sensor 175 detects no pressure, this may indicate a blockage upstream along the flow path. The pressure sensor 175 may also determine if the purge pressure is below a predetermine purge pressure to determine the effectiveness of the harvested inert gas. The fire protection system 100B may include an indicator informing a user of a potential blockage within the flow path or a purge pressure below a predetermined purge pressure amount resulting in a lack of fire protection within a specified area of the aircraft 200.

The pressure monitored from the sensors 175 may be used to control the continuous flow of harvested inert gas to an area of the aircraft 200. For example, if a monitored purge pressure exceeds a predetermined threshold pressure one of the valves 160A-160B may be closed to prevent the continuous purge flow of harvested inert gas to the specific area until the purge pressure drops below the predetermined area. In an embodiment, the fire protection system 100B may only provide a continual purge flow of harvested inert gas and may eliminate the storage of harvested inert gas in one or more storage tanks 155.

Figure 3:
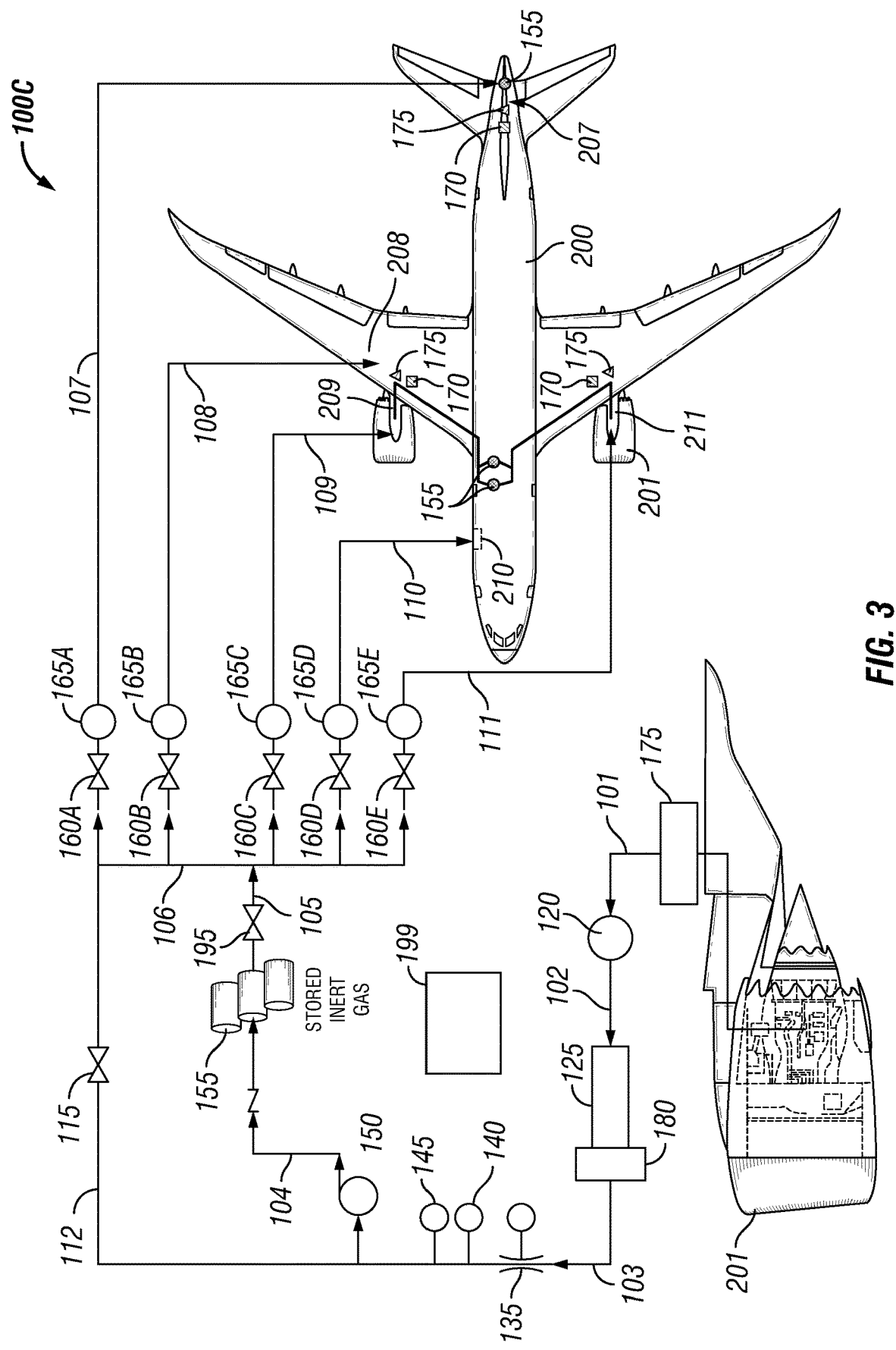
FIG. 3 is a schematic of an embodiment of a fire protection system.

FIG. 3 is a schematic of an embodiment of a fire protection system 100C for an aircraft 200. The fire protection system 100C is similar to the fire protection system 100B of FIG. 2 as the fire protection system 100C includes the storage of harvested inert gas in one or more tanks 155, which may be used to extinguish an ignition event. Additionally, the fire protection system 100C enables continuous flow of harvested inert gas via flow path 112. The fire protection system 100C includes a catalytic converter 175, which enables residual components potential found in the harvested inert gas to be completely burned. The fire protection system 100C also includes an optional filter 180 that may be used in combination with scrubber 125 to remove unwanted components from the harvested inert gas.

Figure 4:
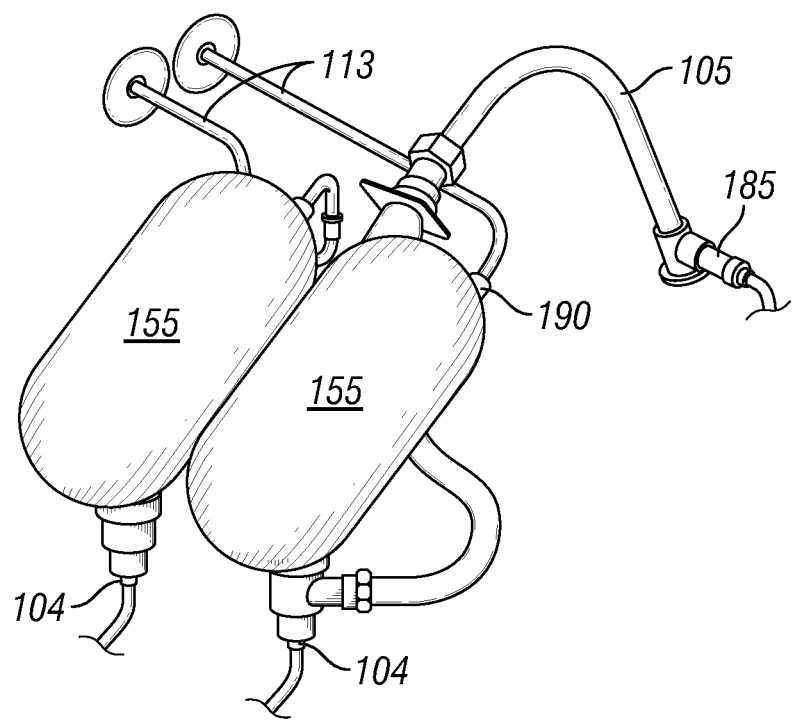
FIG. 4 is a schematic of an embodiment of a storage system for harvested inert gas.

FIG. 4 is a schematic of an embodiment of tanks 155 used to store harvested inert gas. A flow path 104 enable harvested inert gas to be pumped into each tank 155. The tanks 155 may each include an overpressure diaphragm 190 connected to a flow path 113. If the pressure with a tank 155 exceeds a predetermined threshold pressure, the overpressure diaphragm 190 enables harvested inert gas to flow out of tank 155 through the flow path 113 to be vented to atmosphere until the pressure within the tank 155 reduces the below the predetermined threshold pressure. A flow path 105 is connected to each tank 155 to enable the harvested inert gas to flow to a designated area as controlled by the fire protection system. A pressure discharge switch 185 may be positioned along the flow path 105. The pressure discharge switch 185 controls the flow of harvested inert gas through the flow path 105.

Figure 5:
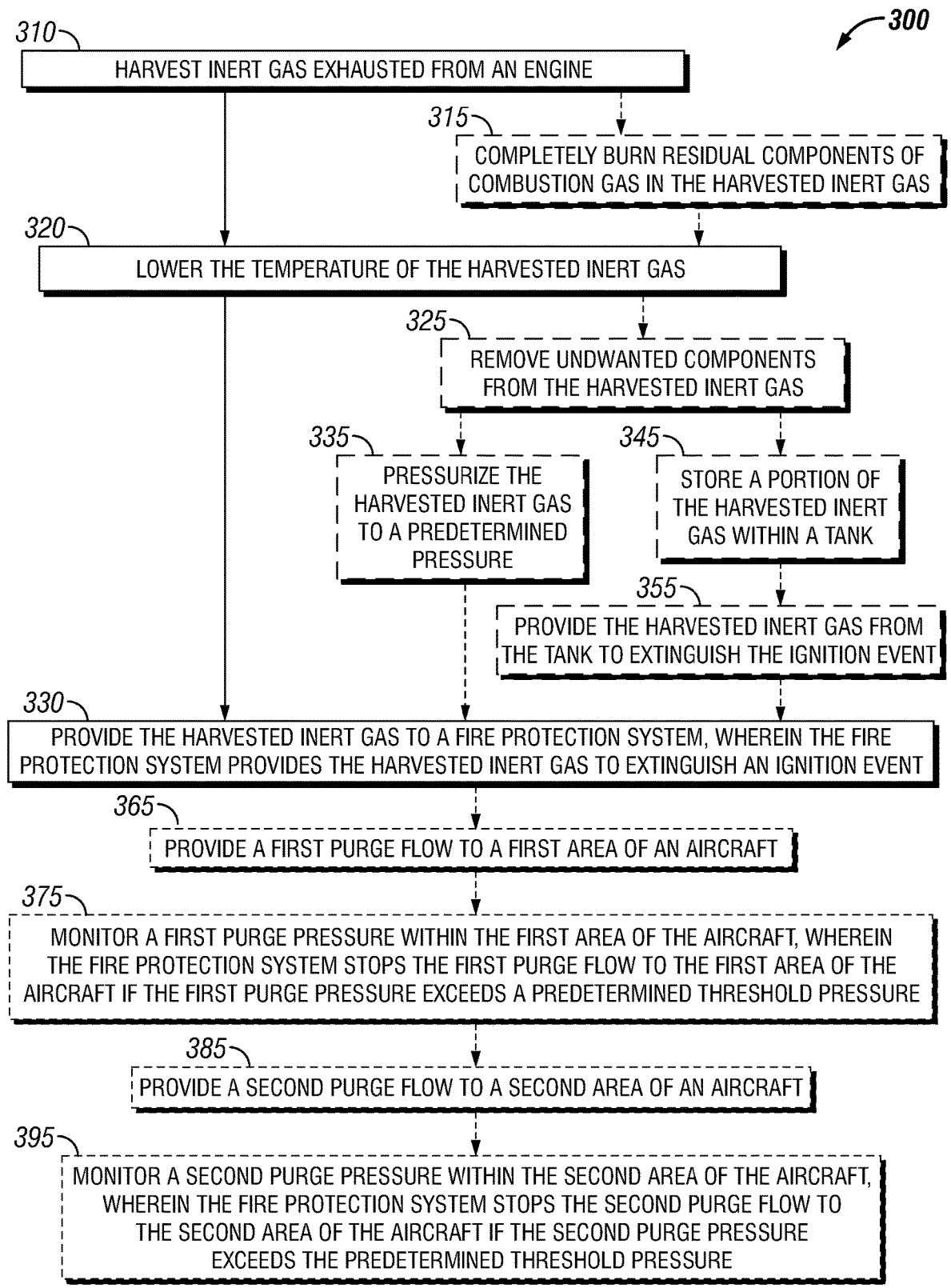
FIG. 5 is a flow chart for an embodiment of a method of harvesting inert gas exhausted from an engine.

FIG. 5 is a flow chart of an embodiment of a method 300. The method 300 includes harvesting inert gas exhausted from an engine, at 310. The method 300 includes lowering the temperature of the harvested inert gas, at 320. For example, the harvested inert gas may pass through a heat exchanger 120. The method 300 may optionally include completely burning residual components of combustion gas in the harvested inert gas, at 315. For example, the harvested inert gas may pass through a catalytic converter 175. The method 300 includes providing the harvesting inert gas to a fire protection system, wherein the fire protection system provides the harvested inert gas to extinguish an ignition event, at 330. For example, upon detection of an ignition event by a sensor 170, a valve 160A-160E may be opened to enable the flow of harvested inert gas from one or more tanks 155 to extinguish the ignition event.

The method 300 may include removing unwanted components from the harvested inert gas, at 325. For example, the harvested inert gas may flow through a scrubber 125, or the like, to remove unwanted components from the harvested inert gas. The method 300 may include pressurizing the harvested inert gas to a predetermined pressure, at 335. For example, a pump 150 may be used to pressurize the harvested inert gas. The method 300 may include storing a portion of the harvested inert gas within a tank, at 345. For example, the harvested inert gas may be stored in one or more tanks 155. The method 300 may include providing the harvested inert gas from the tank to extinguish the ignition event, at 355. For example, the fire protection system may open a valve to enable harvested inert gas stored in the one or more tanks to flow to an extinguish an ignition event.

The method 300 may include providing a first purge flow to a first area of an aircraft, at 365. For example, the fire protection system may enable a continuous purge flow of harvested inert gas to specific areas of the aircraft 200. The continual purge flow of harvested inert gas may prevent an ignition event from occurring. The method 300 may include monitoring a first purge pressure within the first area of the aircraft, wherein the fire protection system stops the first purge flow to the first area of the aircraft if the first purge pressure exceeds a predetermined threshold pressure, at 375. For example, the aircraft 200 may include pressure sensors 175 positioned within areas of the aircraft 200 to monitor the purge pressure. The pressure monitored from the sensors 175 may be used to control the continuous flow of harvested inert gas to an area of the aircraft 200. For example, if a monitored purge pressure exceeds a predetermined threshold pressure one of the valves 160A-160B may be closed to prevent the continuous purge flow of harvested inert gas to the specific area until the purge pressure drops below the predetermined area. The method may also include monitoring the first purge pressure within the first area of the aircraft to determine if the first purge pressure is below a predetermined pressure to determine the effectiveness of the harvested inert gas.

The method 300 may include providing a second purge flow to a second area of the aircraft, at 385. For example, the fire protection system may enable a continuous purge flow of harvested inert gas to specific areas of the aircraft 200. The continual purge flow of harvested inert gas may prevent an ignition event from occurring. The method 300 may include monitoring a second purge pressure within the second area of the aircraft, wherein the fire protection system stops the second purge flow to the second area of the aircraft if the second purge pressure exceeds the predetermined threshold pressure, at 395. The method may also include monitoring the second purge pressure within the second area of the aircraft to determine if the second purge pressure is below a predetermined pressure to determine the effectiveness of the harvested inert gas.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An aircraft fire protection system comprising:
a valve that harvests inert gas exhausted from an engine;
a conduit that receives a flow of inert gas from the valve;
a pump in fluid communication with the conduit and that pressurizes the flow of inert gas;
a heat exchanger in communication with the conduit and the flow of inert gas, wherein the heat exchanger reduces a temperature of the flow of inert gas;
a gas cleaner in communication with the flow of inert gas;
a controller, in electronic communication with at least the valve and the pump, that controls the valve and the pump to control the flow of inert gas; and
a plurality of flow paths to direct the flow of inert gas to a plurality of locations within an aircraft.

2. The aircraft fire protection system of claim 1, wherein inert gas continuously flows to the plurality of locations within the aircraft during operation of the engine.

3. The aircraft fire protection system of claim 1, further comprising a plurality of pressure sensors and a plurality of distribution valves, wherein the plurality of distribution valves prevent the continuous flow of inert gas to a first location when one of the plurality of pressure sensors detects a pressure above a predetermined threshold purge pressure at the first location.

4. The aircraft fire protection system of claim 3, further comprising a plurality of temperature sensors that monitor a temperature of a plurality of areas of the aircraft.

5. The aircraft fire protection system of claim 4, further comprising a plurality of distribution valves, wherein the plurality of distribution valves deliver the flow of inert gas to a second location upon detection of a temperature above a predetermined temperature at the second location by one of the plurality of temperature sensors.

6. The aircraft fire protection system of claim 1, further comprising at least one storage tank in communication with the conduit and the flow of inert gas, wherein the pump is positioned between the heat exchanger and the at least one storage tank and wherein the pump pressurizes the flow of inert gas to the at least one storage tank.

7. The aircraft fire protection system of claim 6, further comprising a pressure sensor, wherein the pressure sensor is positioned along the conduit of the flow of inert gas between the heat exchanger and the at least one storage tank.

8. The aircraft fire protection system of claim 7, further comprising a temperature sensor, wherein the temperature sensor is positioned along the conduit of the flow of inert gas between the heat exchanger and the at least one storage tank.

9. The aircraft fire protection system of claim 8, further comprising a sensor that detects an ignition event, wherein upon detection of the ignition event by the sensor, the controller opens a plurality of valves along the plurality of flow paths to direct the flow of inert gas to the plurality of locations within the aircraft.

10. The aircraft fire protection system of claim 9, further comprising a second pressure sensor, the second pressure sensor located between the heat exchanger and the engine.

11. The aircraft fire protection system of claim 10, further comprising a filter along the conduit of the flow of inert gas, the filter in combination with the gas cleaner removes unwanted components from harvested inert gas.

12. The aircraft fire protection system of claim 11, wherein the unwanted components comprises nitrogen oxides.

13. The aircraft fire protection system of claim 11, wherein the unwanted components comprises carbon monoxide.

14. The aircraft fire protection system of claim 11, wherein the unwanted components comprises hydrocarbons.

15. The aircraft fire protection system of claim 11, wherein the unwanted components comprise sulfur dioxide.

16. The aircraft fire protection system of claim 11, wherein the unwanted components comprises volatile organic compounds.

17. The aircraft fire protection system of claim 11, wherein the unwanted components comprises particular matter.

18. The aircraft fire protection system of claim 8, further comprising a bypass flow path in communication with the conduit of the flow of inert gas between the heat exchanger and the at least one storage tank, wherein the bypass flow path bypasses the at least one storage tank and provides a continuous flow of inert gas to locations within the aircraft during operation of the engine.

19. The aircraft fire protection system of claim 1, further comprising a sensor that detects an ignition event.

20. The aircraft fire protection system of claim 19, wherein upon detection of the ignition event by the sensor, the controller opens a plurality of valves along the plurality of flow paths to direct the flow of inert gas to the plurality of locations within the aircraft.

* * * * *